May 6, 1958   C. ACIERNO   2,833,877
SPEED INDICATOR
Filed May 10, 1955
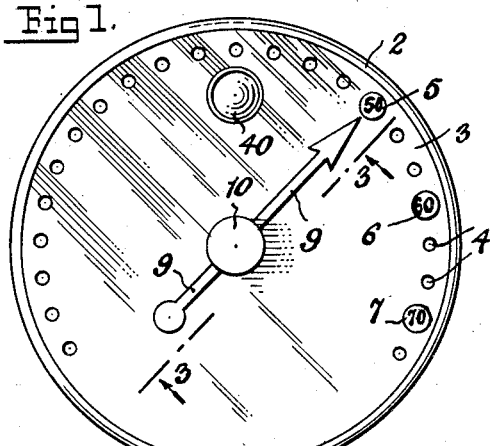
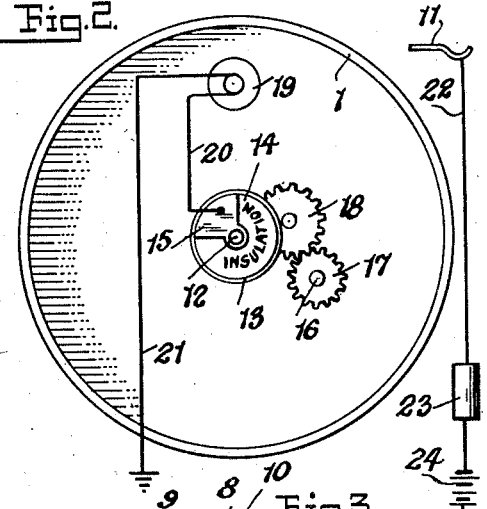
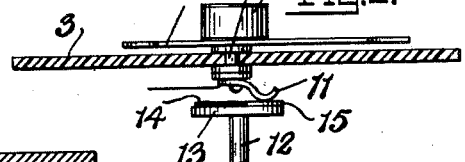
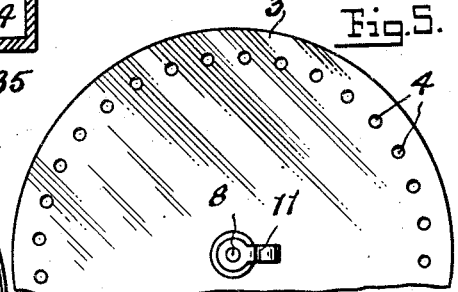
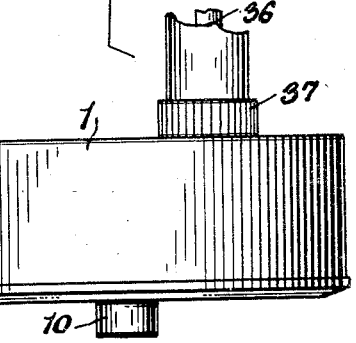
INVENTOR.
Carmine Acierno
BY
Fritz Zweig
Attorney

United States Patent Office 2,833,877
Patented May 6, 1958

2,833,877
SPEED INDICATOR

Carmine Acierno, River Edge, N. J., assignor of one-half to Salvatore Tropea, Fort Lee, N. J.

Application May 10, 1955, Serial No. 507,305

2 Claims. (Cl. 200—56)

This invention relates to speed-indicators, and more particularly to those of the type in which a signal is communicated to the driver of a vehicle when over-speed is reached by the vehicle. It is an object of the invention to provide means by which a visible and/or audible signal is given when any desired predetermined speed is reached by the vehicle, so that driving within any selected speed range can be effected safely and easily and without the need of constantly watching the speedometer.

It is another object of the invention to provide a means which will indicate speed in excess of a predetermined maximum and this regardless of whether the vehicle is proceeding under its own power or is coasting.

It is a further object of the invention to provide an indicating device of the character described which can be either built in as an original part of the vehicle or can be readily installed in a motor vehicle as an accessory, or one which can be incorporated in a speedometer unit if desired.

It is still another object of the invention to provide an indicator as above described, which will not interfere with or restrict the operation of the vehicle in any way throughout the entire speed range. Since many accidents are avoided by the ability of the operator of a vehicle to accelerate quickly and to often exceed the speed limit in doing so, the signalling device, while indicating movement of the vehicle in excess of the speed limit, will nevertheless provide no restriction on the operator to prevent him from doing so when necessary.

With these and other objects to be hereinafter set forth in view, I have devised the arrangement of parts to be described and more particularly pointed out in the claims appended hereto.

In the accompanying drawing, wherein an illustrative embodiment of the invention is disclosed, Fig. 1 is a front elevational view or face view of a speed-indicating device or signal constructed in accordance with the present invention;

Fig. 2 is a somewhat diagrammatic view showing portions of the structure and the electrical circuit;

Fig. 3 is a sectional view, taken substantially on the line 3—3 of Fig. 1, looking in the direction of the arrows;

Fig. 4 shows the gearing by which a drive for the rotatable shaft of the speed-indicator is attained, and parts associated therewith;

Fig. 5 is a view of a portion of the rear of the dial, showing the contact finger, and Fig. 6 shows one of the speed markers or buttons for application to the dial.

Referring to the drawing, 1 indicates the housing for the mechanism of the speed indicator and signalling device. The same may be made in the form shown or in other suitable shape and provided wtih means by which it can be mounted in the instrument panel of the car, or mounted or attached at any desired location in the car so that it can be readily observed by the driver. Secured over the front of the casing 1 by any suitable means such as by a bezel 2, is the dial of the instrument, the same being composed of any suitable insulating material, such as a plastic. The dial 3 is provided adjacent to its marginal edge with a plurality of threaded holes or apertures 4, which are preferably uniformly-spaced apart and are adapted to selectively receive speed-indicating markers or buttons such as indicated at 5, 6 and 7 and as shown in Fig. 6. These markers bear on their heads, suitable numerals indicating various speeds of the vehicle and are adapted to be threadably inserted in the required holes 4 in a manner to be explained. For this purpose, each of the markers is provided with a threaded shank 38 which is threadably received in the selected hole 4, leaving the numeral-bearing head of the marker exposed on the face of the dial 3.

Located centrally of the dial 3 is a shaft 8 which is arranged to be somewhat stiffly adjustable by its manual rotation in the dial so that it will hold any position of adjustment in which it is manually placed. Secured on the shaft on the outer face of the dial 3 is a pointer 9, and at the back of the dial a contact finger 11 is secured on the shaft 8, the contact finger being positioned directly behind the pointer so that the pointer will always designate the position of the finger 11. A knob 10, also secured on the shaft 8, is available for finger engagement on the outside of the dial 3. This arrangement is such that by rotating the knob 10, the shaft 8 and contact finger 11 thereon, as well as the pointer 9, will be moved to thereby position the pointer and the contact finger 11 at any selected point on the dial 3 where it is required that the signal shall operate.

Rotatively mounted within the housing 1 is a shaft indicated at 12, and which shaft is a part of a speedometer mechanism of known type, and which normally carries the indicating pointer of such speedometer. The shaft 12 is driven by a known mechanism which is not herein illustrated in detail since it is well known in this art. It is sufficient to state that the gears indicated respectively at 17 and 18 are part of the drive mechanism which rotates the shaft 12 through a required swing, the shaft 16 being rotated by an external drive means to be presently described.

Mounted on the shaft 12 is a disk 13 which is provided on its outer face with an area 14 of insulating material and is also provided with a segment 15 of metal constituting an electrical conductor. By this arrangement, it will be obvious that when the contact finger 11 rests against the metallic segment 15, a circuit will be closed between the segment, or the shaft 12 on which it is mounted, and the finger 11, the segment and finger thus constituting a switch mechanism by which a signal is caused to be actuated when the vehicle reaches a predetermined speed.

The signal which is thus actuated may be visible, audible or both audible and visible, and in the embodiment shown, the same consists of a lamp 19, preferably but not necessarily contained within the housing 1, and visible through a window 40 provided in the dial 3. It will be noted that the lamp 19 is connected by the lead 20 to the segment 15 or to some part electrically connected thereto, while the lead 21 is grounded. The contact finger 11 is connected by lead 22 to a flasher unit 23 of known type which will cause an intermittent flashing of the lamp 19 while the contact finger 11 rests against the segment 15. The flasher unit is connected to the positive side of the battery. The electrical circuit may be otherwise arranged according to convenience and to the wiring of the particular car or other vehicle to which the device is to be applied, the present electrical circuit being illustrative. Any circuit employed should be one in which the segment 15 and contact finger 11 constitute a switch by which the circuit to the signal will be closed while these parts are in contact.

Referring to Fig. 4, the manner in which a drive is easily established for the signalling device and speed indicator is therein shown. At 26 is shown the conventional speedometer flexible shaft which extends from the transmission to the conventional speedometer of the car. In the present arrangement, one end of this flexible shaft 26 is coupled by a coupling ring 30 to shaft 28 contained in a gearbox indicated at 25. At its opposite end, the shaft 28 is coupled, by the coupling ring 30, to a flexible shaft 31 which extends to the speedometer. Shaft 28 carries a gear 29 which is in mesh with an idler gear 32 that meshes with a gear 34 on a shaft 33, rotatively mounted in the gear box 25. Shaft 33 is coupled by the coupling ring 35 to a flexible shaft 36 that extends to the housing 1 and is coupled to the shaft 16 by means of the coupling ring 37. This arrangement is such that the drive for the signalling device is taken off the conventional drive for the speedometer by simple gearing and by variation of the relative sizes of the gears in the gear box 25, the ratio of speed between the shaft 26 and that shown at 36 can be varied when required. While the gear box 25 is shown as spaced from the casing 1 for simplicity in illustration, it might be directly mounted thereon or even actually incorporated into the housing 1.

From the foregoing, the operation of the improved signalling device and speed indicator will be readily understood. The device can be readily adjusted for the individual car by turning the pointer 9 to the point where the light will start its flashing when the car reaches the point of excess speed as determined by the regulation speedometer of the car. A suitable button 5 indicating the speed at this point can be placed in the hole 4 then designated by the pointer. Other buttons can be placed accordingly. It will be obvious that each time the vehicle reaches the point of excess speed, the light 19 will flash and if desired, this can be accompanied by an audible signal. The signal will remain in operation while the contact finger 11 is in contact with the metal segment 15 and this can be from the lowest rate of excess speed to the highest. As soon as the speed is lowered and the disk 13 reverses its movement, the circuit between the finger 11 and the segment 15 will be broken and the signal 19 will no longer be flashed.

While I have herein described a single embodiment of the invention, it is obvious that the same is not to be restricted thereto, but is broad enough to cover all structures coming within the scope of the annexed claims.

What I claim is:

1. In a speed-indicating device and warning signal, a speedometer drive including a gear, an idler gear in mesh with said gear, a third gear in mesh with the idler gear, a shaft on which the third gear is mounted, the signal device including a housing, a drive shaft rotative therein, means coupling the shaft of the third gear with the drive shaft to thereby cause rotative movement of the said drive shaft, a disk rotatively mounted within the housing, means for driving said disk from the drive shaft, said disk having a contact segment, a dial over the face of the housing, a pointer rotatively mounted and manually adjustable over the face of the dial, a contact finger carried with the pointer and manually adjustable to selected positions to correspond to those indicated by the pointer on the dial, said finger and segment being in an electrical circuit, whereby circuit will be closed when the finger is in contact with the segment.

2. A speed-indicating device acting as a warning signal for vehicles comprising, a rotative shaft, means for rotating the shaft from the transmission to an extent dependent upon the speed of the vehicle, a disk carried by and rotated with said shaft, said disk having a face provided with a contact segment, a dial fitted over the disk and mounted stationarily with respect thereto, a pointer adjustably carried by the dial and adapted for the designation of different vehicle speeds on the dial, a contact finger carried by the pointer and adapted to contact the segment at a predetermined speed of the vehicle, the contact of the finger with the segment closing circuit, and means by which the dial can be calibrated according to vehicle speeds determined by a speedometer in the vehicle to thereby adjust the speed-indicating device for operation at a predetermined vehicle speed.

References Cited in the file of this patent

UNITED STATES PATENTS

| | | |
|---|---|---|
| 513,829 | Schureman | Jan. 30, 1894 |
| 1,634,069 | Cordray | June 28, 1927 |
| 2,251,475 | Walker | Aug. 5, 1941 |
| 2,322,703 | Polin | June 22, 1943 |
| 2,511,503 | Greenberg | June 13, 1950 |
| 2,538,218 | Treese | Jan. 16, 1951 |